United States Patent Office 2,792,375
Patented May 14, 1957

2,792,375

POLYMERIZATION OF STYRENE OXIDE

John D. Bartleson, Franklin, Mich., assignor to The Standard Oil Company, Cleveland, Ohio, a corporation of Ohio No Drawing. Application August 25, 1953, Serial No. 376,530

1 Claim. (Cl. 260—2)

The present invention relates to a process for the polymerization of styrene oxide in the presence of boron trifluoride as a catalyst.

It has previously been disclosed in the United States Patent No. 2,293,868 that boron trifluoride is capable of catalyzing the polymerization of alkylene oxides such as ethylene oxide. The patent recommends a reaction temperature ranging from about 20° to about 150° C. In a more specific teaching of the patent ethylene oxide is polymerized by passing gaseous ethylene oxide into a solution of a boron trifluoride-diethyl ether complex in ethylene dichloride at a temperature of about 30° C. Under these conditions, the primary product is the dimer of ethylene oxide, i. e., dioxane. In other teachings of the patent ethylene oxide is reacted with a glycol to form a polyglycol, the reaction in every instance requiring a reaction time of several hours. From this disclosure, it is apparent that ethylene oxide reactions catalyzed by boron trifluoride at the temperatures suggested are sluggish reactions and that the molecular weights of the resulting products are relatively low.

In accordance with the present invention, it has been found that boron trifluoride is a highly effective catalyst for the low-temperature polymerization of styrene oxide. While ordinarily it would be expected that a decrease in the temperature of a reaction would result in a slower reaction, this was not found to be so when boron trifluoride was employed as a catalyst for the polymerization of styrene oxide. The reaction of this invention is comparatively fast and it is capable of providing quantitative yields of high molecular weight polymers.

The process of the present invention is preferably performed at a temperature within the range of —40 to +10° C. The preferred mode of accomplishing the reaction is to pass the gaseous boron trifluoride through a solution of styrene oxide in an inert vehicle such as a liquid hydrocarbon in which the boron trifluoride is soluble. Under these conditions it has been found that a reaction time of from about 4 to about 10 minutes is generally sufficient although longer reaction times are not harmful. After the reaction is complete, the styrene oxide polymer can be recovered by adding sodium hydroxide to neutralize the boron trifluoride catalyst and thereafter washing the mixture with water, drying the water insoluble layer, filtering off the insolubles, and evaporating the vehicle to obtain the polymer.

The molecular weight of the polymer can be widely varied by appropriate adjustment of the reaction conditions. Ordinarily, the polymer will have a molecular weight between about 400 and about 700. However, products of lower molecular weight can be prepared by adding to the reaction mixture varying amounts of a monohydric alcohol, such as methanol, ethanol, butanol, etc., which will act as a chain stopper and decrease the molecular weight of the product.

In order to demonstrate the invention and its attendant advantages, the following example is given.

Example

A solution comprising 10 g. of styrene oxide dissolved in 30 ml. of pentane was placed in a reaction vessel which was immersed in a Dry Ice-kerosene bath at —29° C. After the solution had cooled to approximately the temperature of the bath, boron trifluoride was then bubbled slowly through the solution at a rate of approximately 7,000 cc. per hour (about 1 mole percent). After 4 minutes all of styrene oxide had polymerized. A solution made up by dissolving 0.5 g. of sodium hydroxide in 10 ml. of methanol was then added for the purpose of neutralizing the catalyst. The resulting mixture was washed with water, decanted, dried, and filtered. The product was recovered from the filtrate by evaporating the normal pentane and there was obtained 10 g. of a mixture of a viscous liquid and solid polymer which was oil insoluble. The molecular weight of the product was estimated to be within the range of about 400 to 700.

It is obvious that many modifications can be made in the process of the invention without departing from the scope of the invention. For example, other inert vehicles such as benzene can be substituted for the pentane employed in the example. Similarly, the process is applicable to the preparation of various copolymers of styrene oxide such as copolymers with ethylene oxide, propylene oxide, and other compounds possessing the epoxy linkage.

It is intended to cover all such changes and modifications in the example of this invention herein given for purposes of this disclosure which do not constitute departure from the spirit and scope of the appended claim.

I claim:

A process for homopolymerizing styrene oxide which comprises passing boron trifluoride through a solution of styrene oxide in a liquid hydrocarbon at a temperature of about —29° C. and recovering a homopolymer of styrene oxide.

References Cited in the file of this patent

UNITED STATES PATENTS 2,555,500    Morehouse et al. _____ June 5, 1951